Figure 1:
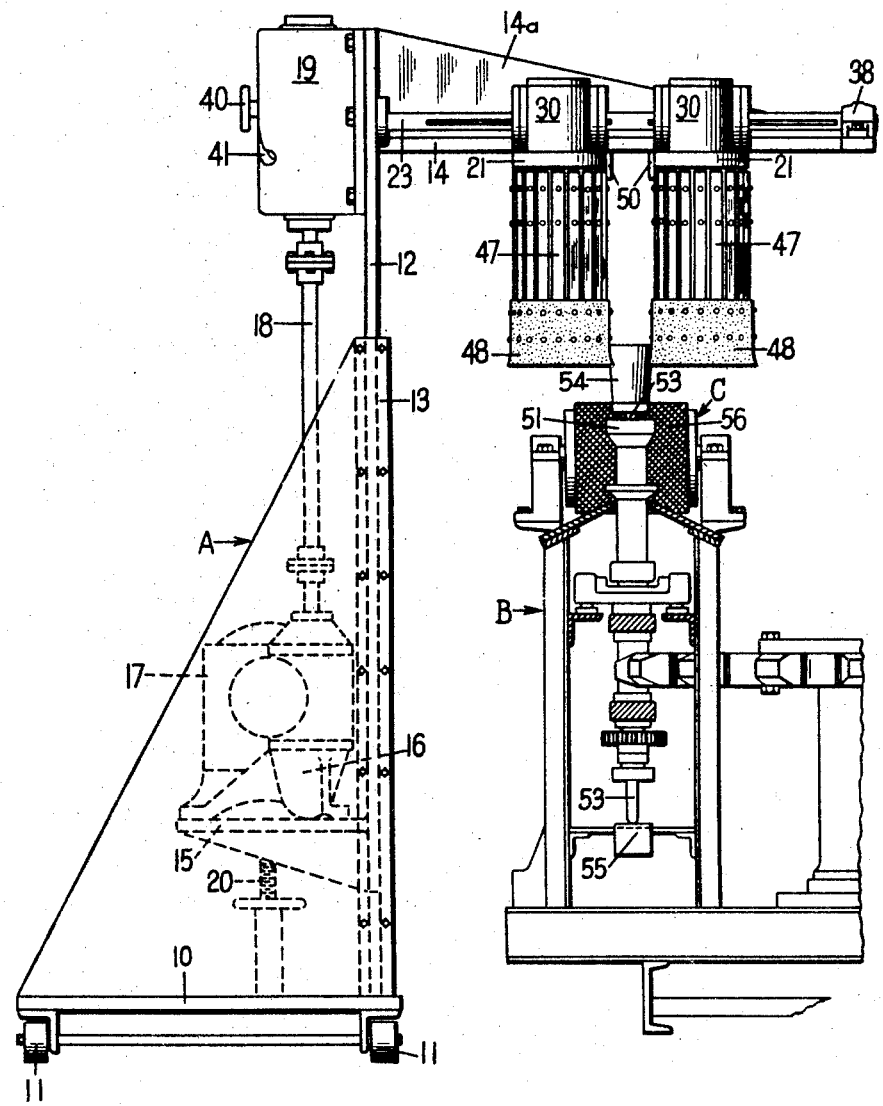
Figure 3:
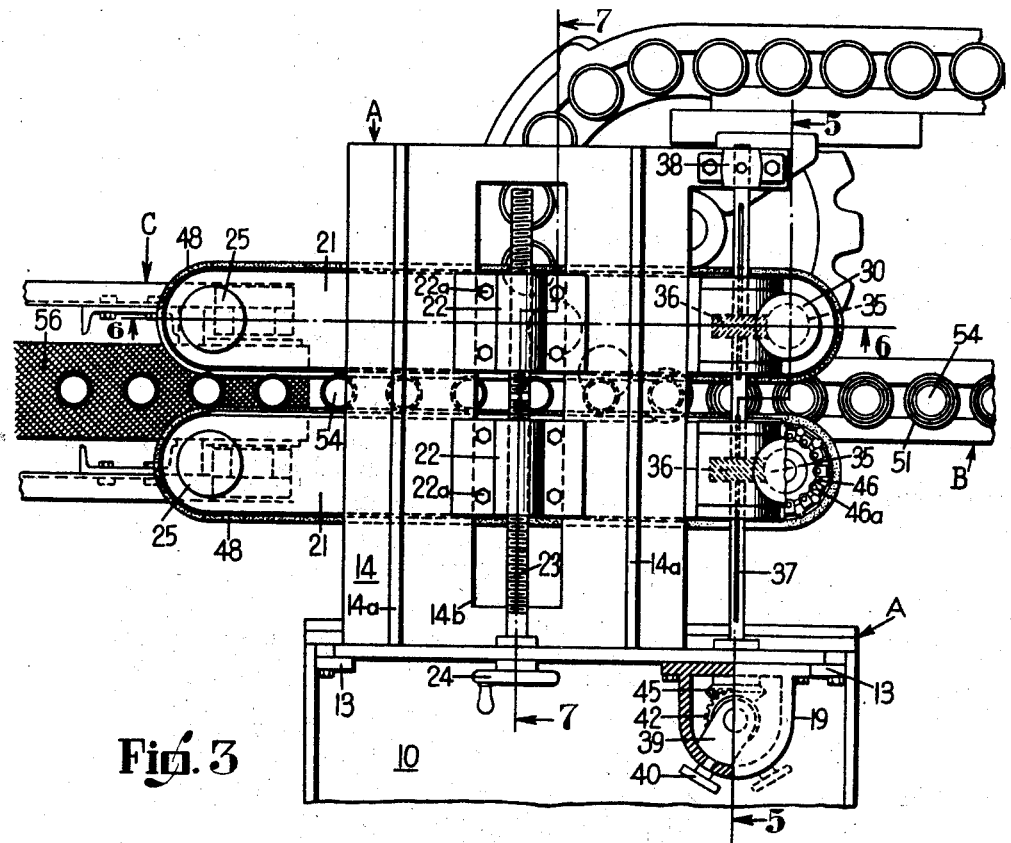
Figure 4:
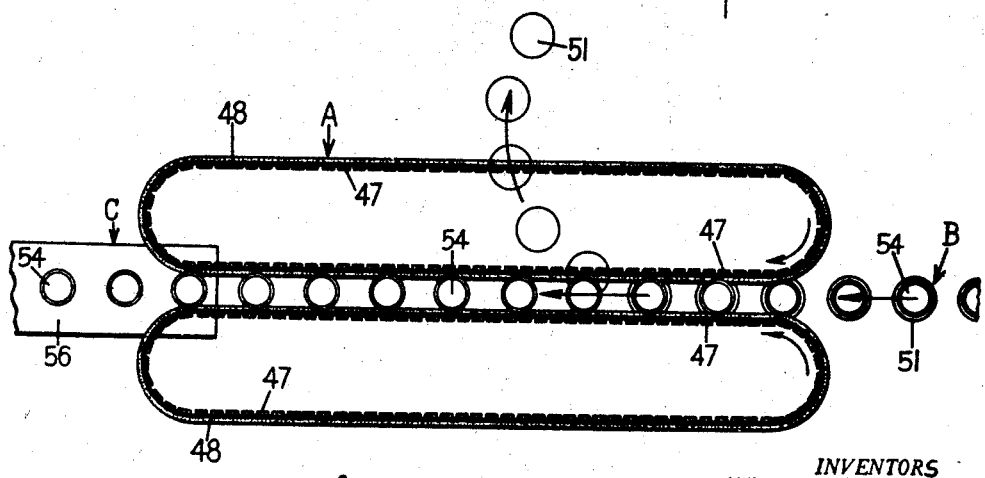

INVENTORS
William L. McNamara.
Frederick Z. Fouse.
BY Corbett, Mahoney + Miller
ATTORNEYS

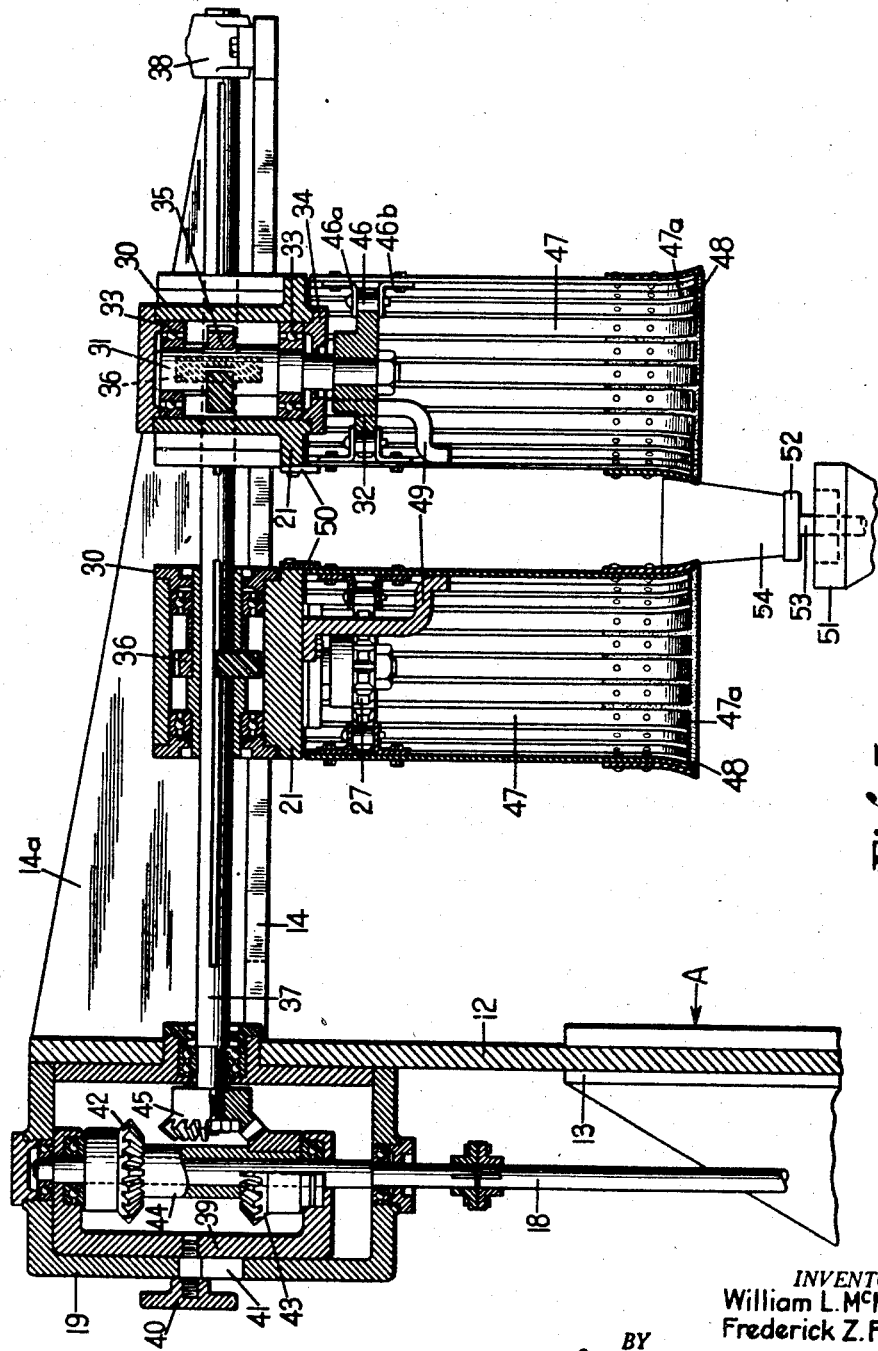

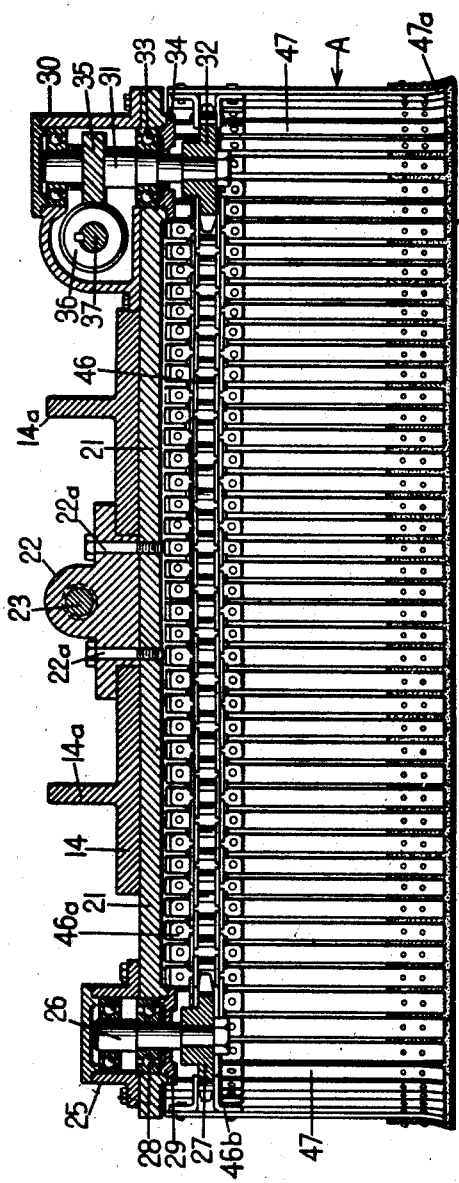
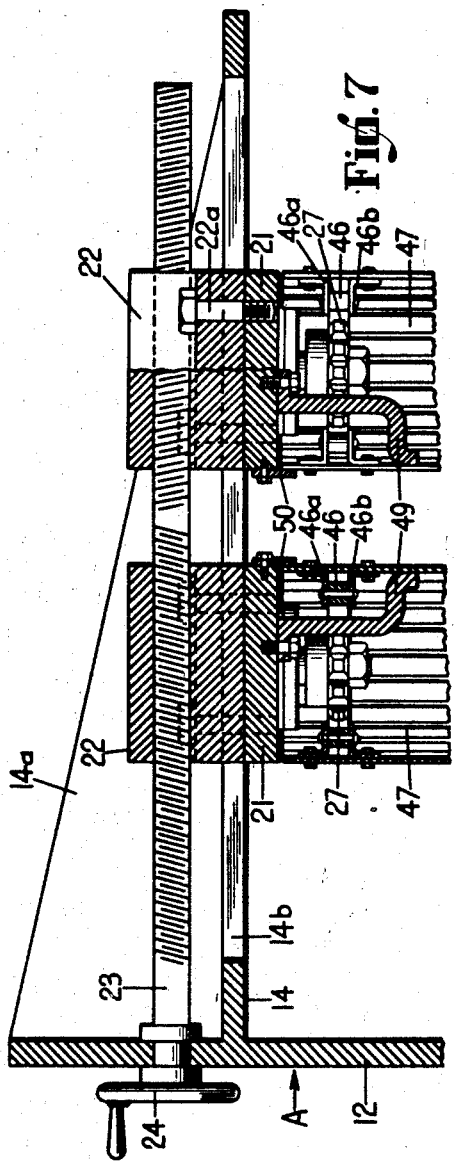

Patented June 3, 1947

2,421,515

UNITED STATES PATENT OFFICE 2,421,515

ARTICLE TAKE-OFF OR TRANSFER APPARATUS

William L. McNamara and Frederick Z. Fouse, Lancaster, Ohio, assignors to Anchor Hocking Glass Corporation, Lancaster, Ohio, a corporation of Delaware Application August 2, 1945, Serial No. 608,390

16 Claims. (Cl. 198—20)

The present invention relates to an article take-off or transfer apparatus or mechanism. It has to do, more particularly, with improved means for transferring a series of articles from one moving conveyor or supporting surface to another moving conveyor or supporting surface. One of its particular uses is in connection with the removal or transfer of a series or plurality of articles of ware from the travelling or moving conveyor of a glazer to another and spaced moving conveyor or supporting surface, in which the articles are arranged in a row and in spaced relationship on the glazer conveyor and where it is desirable to place these articles in the same or substantially the same spaced relationship on the second moving conveyor or supporting surface.

One of the objects of the present invention is to provide improved means of the foregoing character for transferring a series or row of articles from a moving conveyor or support to another moving conveyor or support with the transferred articles being deposited or placed in the same, or substantially the same arrangement upon the second moving conveyor as they were on the first moving conveyor.

Another object of the present invention is to provide improved means of the foregoing character which may be of portable nature and capable of being moved into cooperative relationship with a pair of spaced moving conveyors or supporting surfaces.

A further object of the invention is to provide improved means for transferring a row of spaced articles from one moving conveyor onto another moving conveyor at a point spaced from the first-named conveyor, in which said means comprises a pair of endless conveyors arranged in spaced substantially parallel planes and together providing means for engaging and gripping a series or plurality of articles therebetween to effect their transfer from one moving conveyor to the other moving conveyor; it being another object of the invention to permit the adjustment of the pair of endless conveyors toward and away from one another to accommodate and handle articles of different sizes and shapes.

Another object of the present invention is to provide take-off or transfer means as aforesaid, in which the endless conveyors of the pair are of flexible nature so as to grip articles therebetween and support the same without damage to the articles.

A further object of the present invention is to provide take-off or transfer means in accordance with the foregoing wherein said means is power-driven and capable of being operated at various predetermined speeds, and wherein the direction of travel of said means may be reversed when and if desired; it being another object of the invention to provide means of the foregoing character which is of relatively simple construction and capable of being produced and operated at relatively low cost.

Another object of the present invention is to provide improved article take-off or transfer means for transferring articles from one moving conveyor to another spaced moving conveyor, in which said means comprises a pair of opposed and spaced endless flexible conveyors which together grasp and transfer the articles in a row and which span or bridge the gap or space between said spaced moving conveyors.

Various devices and apparatus have heretofore been used for transferring articles from one location to another location such, for example, as from a glazer conveyor to a lehr conveyor. None of these devices has, however, been capable of picking up, gripping and transferring a series or plurality of articles arranged in a row upon a moving conveyor or support and placing said articles in substantially their original arrangement upon another and spaced travelling conveyor or moving supporting surface. It is, therefore, the purpose of the present invention to perform such a function in a rapid and efficient manner and without damage or injury to the articles being transferred.

Generally speaking, the present invention relates to improved means or an apparatus which may be of portable nature and of a power-driven character comprising a pair of substantially parallel spaced and adjustable flexible endless conveyors which are associated with a pair of spaced endless moving conveyors or supporting surfaces for the purpose of engaging and gripping between the spaced endless conveyors a row of articles located and travelling on one supporting surface and transferring them to the other moving supporting surface without changing, or substantially changing their arrangement. The apparatus comprises means for permitting the adjustment of the endless conveyors toward and away from each other so as to vary the article gripping space between the conveyors to permit the device to be used in the transfer of articles of various sizes and shapes. The pair of associated flexible endless conveyors are adjustable vertically as a unit so as to accommodate the device to spaced moving conveyors or supporting sur- The housing 30 and the opening in the plate provide means for supporting suitable shaft bearings 33. The opening in the plate 21 is preferably closed by an apertured closure plate or cover 34. The driving shaft 31 carries a helical or spiral gear 35 which, as seen in Fig. 6, meshes with a similar helical or spiral gear 36 located within the housing 30 and keyed to a driving shaft 37 so as to be rotated by and with said shaft. The shaft 37 extends from the reversing gear box or transmission housing 19 horizontally above the bracket 14 and is provided with a similar gear 36 located within each of the housings 30 carried by each of the adjustable supporting plates or members 21, the outer end of the shaft 37 being journalled in a suitable bearing 38 carried at the outer edge or extremity of the bracket 14, see Fig. 5.

Referring now particularly to Fig. 5, it will be seen that the housing 19 which receives the upper end of the power-transmitting shaft 18, carries an adjustable fork or yoke member 39 having an operating handle or button 40, which latter is located on the outside of housing 19 and is connected by a threaded shank with the yoke. The shank has an unthreaded portion which allows it to travel in a curved slot 41 formed in the wall of the housing 19. A pair of opposed bevel gears 42 and 43, between which a spacer sleeve 44 is located, are slidably mounted upon the shaft 18 and are movable so as to bring one of the bevel gears 42 or 43, into mesh with a beveled gear 45 carried by the adjacent inner end of the shaft 37. The purpose of the reversing gearing within the housing 19 is to permit either of the beveled gears 42 or 43 to be brought into mesh and driving relationship with the bevel 45, so as to rotate the shaft 37 and the helical gears 36 either in a clockwise or counterclockwise direction.

Each of the pairs of sprockets 27 and 32 carries an endless sprocket chain 46. The links of this chain have upwardly and downwardly projecting vertical ears or brackets 46a and 46b, respectively. Mounted upon each pair of ears adjacent its upper end is a substantially vertically disposed depending metal finger or bar 47, the lower end of the bar or finger being flared slightly outwardly at 47a. A series or plurality of the spring-like fingers is provided, with the fingers being relatively closely spaced so as to provide, in effect, a belt-like continuous endless vertically disposed band or conveyor. The lower end portions of the fingers or bars 47 carry an external skirt or band 48 which is formed, preferably, from non-metallic material such, for example, as asbestos, or other fireproof material.

It will be noted, see particularly Fig. 5, that each of the adjustable plates 21 thus carries one of the belt-like conveyors or bands formed by the fingers 47 and the skirt 48. These conveyor members depend in substantial parallelism below the pair of plates 21. In order to maintain the inner courses of the conveyors formed by the fingers 47 normally in vertical and substantially parallel relationship, each plate 21 carries a longitudinally extending brace member or bracket 49 whose lower end is in contact with the inner faces or surfaces of the fingers 47. To prevent the inner courses of the conveyors from moving inwardly toward one another, each of the plates 21 along its inner edge is provided with a bar or strip 50 which overlaps the outer faces of the fingers 47 at their upper ends.

When the electric motor 17 is operated to drive the reduction gearing within the housing 16, power is transmitted by the shaft 18 through the gears 42 and 45 or 43 and 45, whichever the case may be, to the driving shaft 37 and in turn through the helical gears 36 and 35 to the driving sprockets 32 to drive the sprocket chains 46 and their supported finger-formed conveyors. It will be understood that the helical gears 36 and 35 of each pair have their threads reversed so that the driving sprockets 32 and the sprocket chains 46 are driven in opposite directions so as to move the inner opposed courses of the conveyors formed by the fingers 47, in the same direction.

Merely by way of illustration, we have shown our take-off or transfer means or mechanism in use in connection with the endless conveyor of a glazing machine for the purpose of removing articles from said conveyor and transferring them to another moving conveyor or supporting surface, shown as a whole at C, to be conveyed away. As seen in the drawings, the glazing machine conveyor, shown as a whole at B, comprises a plurality of independent spaced article supporting members 51 each being socketed to receive an ejector disk or so-called "valve member" mounted upon a vertically disposed reciprocable pin or stem 53. Each of the article supports carries a separate spaced article, such as a tumbler 54. These spaced articles are arranged in a single lineal row, as shown. Located beneath the article supporting members 51 and the stems 53 is a trackway 55 over which the lower ends of the stems 53 are moved. When it is desired to take-off or transfer a group of the articles 54 in their row-like relationship, the take-off unit A is moved into position with relation to the glazer unit B so that the band-like article conveying or gripping conveyors will be disposed above and at opposite sides of the straight-away path of travel of the glazer moving conveyor, see particularly Fig. 1. As the articles are carried toward the unit A, the lower ends of the stems 53 ride up an inclined portion of the track 55 so as to elevate the successive articles 54 into position between the depending opposed conveyors or gripping bands of the take-off unit. As the articles successively enter the space between the take-off conveyors, the upper portions of the articles will be gently but firmly gripped and held between the opposed inner courses of the conveyors and transported away from the glazer conveyor in their elevated positions.

In accordance with the present invention, the row of articles being carried or conveyed by the take-off apparatus is placed upon another endless conveyor, such as that shown as a whole at C, Fig. 2. It will be seen that the conveyor C comprises an endless belt or band 56 which is driven in any suitable manner by suitable driving mechanism (not shown). It will be understood that the conveyor members of the take-off apparatus are adjusted by the adjusting screw 20 to the proper elevation so as to properly remove the row of articles 54 from the supporting elements of the glazer conveyor and place them in like or similar arrangement upon the conveyor belt 56 to be carried away.

While we have shown the take-off or transfer means or apparatus of our present invention as being of portable nature, it is to be understood that the casters or rollers 11 may be eliminated and the base of the apparatus set in a fixed position upon the floor in association with the discharge end of one moving conveyor and the receiving end of another and spaced endless conveyor or supporting surface. If desired, the transfer or take-off apparatus may remove articles in rows from a moving supporting surface in one room and place them in position upon another moving supporting surface to be carried or transferred to a remote point such, for example, as into another room, or to a feeder conveyor for a lehr.

Regardless of what types of spaced conveyors the take-off or transfer apparatus of our invention is used with, it will be understood that the pair of adjustable and endless driven conveyors are so positioned between the spaced delivering and receiving conveyors as to span or bridge the gap or space between said spaced conveyors.

It will be evident from the foregoing description that by providing the pair of conveyors of the take-off apparatus with adjustability, the device is capable of being used to pick up, transport, and deposit a row of articles of various sizes and shapes.

Having thus described our invention, what we claim is:

1. Apparatus for removing a series of articles from a moving conveyor, comprising a base having casters permitting the apparatus to be moved over a supporting surface, an upright frame carried by the base and vertically adjustable with relation thereto, a substantially horizontal bracket projecting laterally from said upright frame, a pair of endless conveyors depending from said bracket and extending in substantial parallelism beyond said frame, and power means for driving said pair of conveyors in opposite directions at a predetermined rate of speed, the adjacent courses of the conveyors travelling in the same direction and cooperating with one another to engage and grip articles therebetween to remove said articles from the moving conveyor and transfer them to another moving conveyor or supporting surface.

2. Structure according to claim 1, wherein means is provided for adjusting the pair of endless conveyors relatively to one another whereby to accommodate the apparatus for the handling of articles of different sizes and shapes.

3. Structure according to claim 1, wherein means is provided for reversing the direction of travel of the pair of endless conveyors.

4. Structure according to claim 1, wherein each of the endless conveyors of the pair comprises a chain and a plurality of closely spaced spring-like metallic fingers depending from the outer periphery of the chain.

5. Structure according to claim 1, wherein each of the endless conveyors of the pair comprises a chain, a plurality of closely spaced spring-like metallic fingers depending from the outer periphery of the chain, and a band of non-metallic fireproof material carried by the lower end portions of said fingers.

6. Structure according to claim 1, wherein the endless conveyors of the pair are flexible.

7. Apparatus for removing a series of articles from a moving conveyor, comprising a base, an upright frame carried by the base and vertically adjustable with relation thereto, a substantially horizontal bracket projecting laterally from said upright frame, a pair of endless conveyors depending from said bracket and extending in substantial parallelism beyond said frame, and power means for driving said pair of conveyors in opposite directions at a predetermined rate of speed, the adjacent stretches of the conveyors travelling in the same direction and cooperating with one another to engage and grip articles therebetween to remove said articles from the moving conveyor and transfer them to another moving conveyor or supporting surface.

8. Structure according to claim 7, wherein the endless conveyors of the pair are flexible.

9. Structure according to claim 7, wherein means is provided for adjusting the pair of endless conveyors relatively to one another whereby to accommodate articles of different sizes and shapes.

10. Structure according to claim 7, wherein means is provided for reversing the direction of travel of the pair of endless conveyors.

11. Structure according to claim 7, wherein means is provided for adjusting the pair of endless conveyors relatively to one another whereby to accommodate articles of different sizes and shapes, and wherein means is also provided for reversing the direction of travel of the pair of endless conveyors.

12. Structure according to claim 7, wherein each of the endless conveyors of the pair comprises a chain and a plurality of closely spaced spring-like metal bars depending from the outer periphery of the chain.

13. Structure according to claim 7, wherein each of the endless conveyors of the pair comprises a chain, a plurality of closely spaced spring-like metal bars depending from the outer periphery of the chain, and a skirt of non-metallic fireproof material carried by the lower end portions of said bars.

14. Apparatus for removing a series of articles from a moving conveyer comprising a frame, a pair of endless conveyers supported by said frames and extending in substantial parallelism, power means for driving said pair of conveyers in opposite directions at a predetermined rate of speed, the adjacent stretches of the conveyers traveling in the same direction and cooperating with one another to engage and grip articles therebetween to remove said articles from the moving conveyer and transfer them to another supporting surface, each of the endless conveyers of the pair including a plurality of closely spaced depending spring-like metal bars.

15. Apparatus according to claim 14 wherein the spring-like metal bars carry a continuous article-engaging member.

16. Apparatus according to claim 14 wherein a skirt of non-metallic fireproof material is carried by the lower end portions of said bars.

WILLIAM L. McNAMARA.
FREDERICK Z. FOUSE.

REFERENCES CITED

The following references are of record in the file of this patent:

UNITED STATES PATENTS

| Number | Name | Date |
|---|---|---|
| 1,906,605 | Hutchinson | May 2, 1933 |
| 2,284,928 | Spohr | June 2, 1942 |
| 1,811,201 | Kleinberg | June 23, 1931 |

June 3, 1947. D. H. MITCHELL 2,421,516
APPARATUS FOR SUPPORTING A PORTABLE RADIO SET
Filed March 29, 1943 3 Sheets-Sheet 1
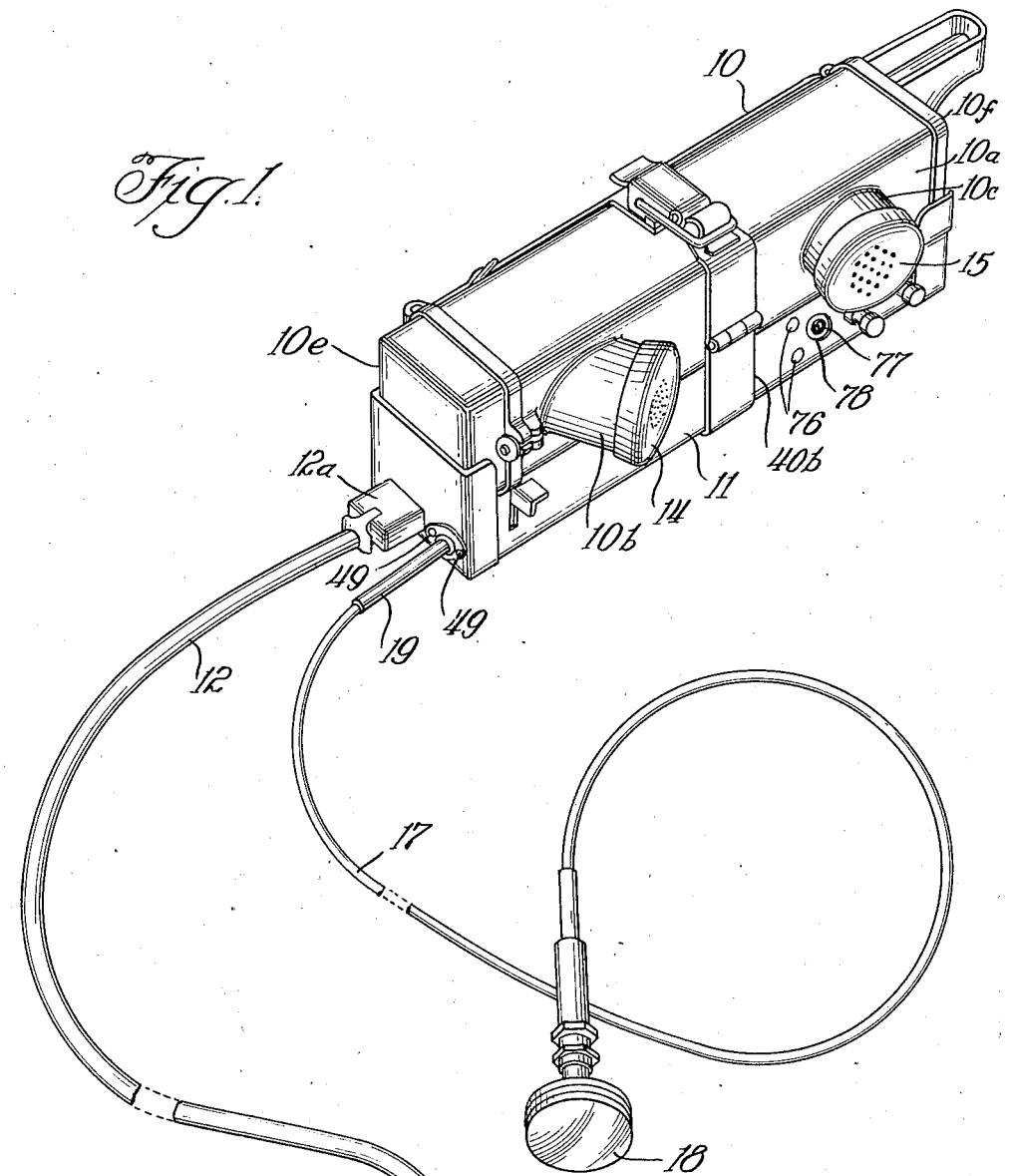
Inventor:
Donald H. Mitchell